US007574723B2

(12) United States Patent
Putterman et al.

(10) Patent No.: US 7,574,723 B2
(45) Date of Patent: Aug. 11, 2009

(54) HOME MEDIA NETWORK (75) Inventors: Daniel Putterman, San Francisco, CA (US); Brad Dietrich, San Francisco, CA (US); David Williams, San Francisco, CA (US); Jeremy Toeman, San Francisco, CA (US); Michael Shiloh, San Francisco, CA (US); Keith Craigie, San Francisco, CA (US); John Doornbos, San Francisco, CA (US); Paul Novaes, San Mateo, CA (US); Song Huang, Scotts Valley, CA (US); Terry Barsoom, San Francisco, CA (US); Pedro Freitas, San Francisco, CA (US)

(73) Assignee: Macrovision Corporation, Santa Clara, CA (US)

( * ) Notice: Subject to any disclaimer, the term of this patent is extended or adjusted under 35 U.S.C. 154(b) by 0 days.

(21) Appl. No.: 09/910,316

(22) Filed: Jul. 19, 2001

(65) Prior Publication Data
US 2003/0135859 A1 Jul. 17, 2003

(51) Int. Cl.
*H04N 7/18* (2006.01)

(52) U.S. Cl. ............................ 725/80; 725/55; 725/59; 725/78; 725/82; 725/133; 725/141; 725/153; 709/229; 709/230; 709/231; 715/717; 715/737; 386/46; 386/83

(58) Field of Classification Search ................ 725/59, 725/55, 78, 80, 82, 133, 141, 153; 715/717, 715/737; 386/46, 83; 709/229, 231
See application file for complete search history.

(56) References Cited

U.S. PATENT DOCUMENTS 5,506,932 A    4/1996   Holme
5,751,672 A    5/1998   Yankowski
5,793,366 A *  8/1998   Mano et al. ................ 715/839
5,798,921 A    8/1998   Johnson et al.
5,815,297 A *  9/1998   Ciciora ...................... 398/112
5,835,126 A   11/1998   Lewis
5,883,621 A *  3/1999   Iwamura ...................... 725/37
5,930,473 A    7/1999   Teng et al.

(Continued)

FOREIGN PATENT DOCUMENTS

| EP | 0 932 275 A2 * | 7/1999 |
| EP | 1217787 A2 | 6/2002 |
| EP | 1427148 | 11/2003 |
| WO | WO 99/14945 * | 3/1999 |
| WO | WO 99/35753 * | 7/1999 |
| WO | WO 99/64969 | 12/1999 |
| WO | WO 00/17738 | 3/2000 |
| WO | WO 00/59230 | 10/2000 |

OTHER PUBLICATIONS

U.S. Appl. No. 10/099,064, filed Mar. 14, 2002, Putterman et al.

(Continued)

*Primary Examiner*—Jason P Salce
(74) *Attorney, Agent, or Firm*—Andy T. Pho; Macrovision Patent Department (57) ABSTRACT

According to one embodiment, a method is described. The method includes receiving a request at a control module from a first remote device to access media data from a storage management module and determining that a first user is requesting access to the data based upon a first remote identification (ID). The method further includes opening a second stream between the playback module and the storage management module and receiving the data at the playback module.

11 Claims, 11 Drawing Sheets

U.S. PATENT DOCUMENTS

| | | | |
|---|---|---|---|
| 5,945,988 A * | 8/1999 | Williams et al. | 345/747 |
| 5,977,964 A * | 11/1999 | Williams et al. | 345/721 |
| 6,008,802 A * | 12/1999 | Iki et al. | 345/721 |
| 6,032,202 A * | 2/2000 | Lea et al. | 710/8 |
| 6,038,614 A * | 3/2000 | Chan et al. | 710/1 |
| 6,085,236 A * | 7/2000 | Lea | 709/220 |
| 6,111,677 A * | 8/2000 | Shintani et al. | 398/126 |
| 6,118,450 A | 9/2000 | Proehl | |
| 6,154,206 A * | 11/2000 | Ludtke | 713/168 |
| 6,160,796 A * | 12/2000 | Zou | 370/257 |
| 6,169,725 B1 * | 1/2001 | Gibbs et al. | 370/216 |
| 6,177,931 B1 * | 1/2001 | Alexander et al. | 725/52 |
| 6,182,094 B1 * | 1/2001 | Humpleman et al. | 715/513 |
| 6,208,341 B1 | 3/2001 | van Ee et al. | |
| 6,219,839 B1 * | 4/2001 | Sampsell | 725/40 |
| 6,232,539 B1 | 5/2001 | Looney et al. | |
| 6,236,395 B1 * | 5/2001 | Sezan et al. | 345/723 |
| 6,237,049 B1 * | 5/2001 | Ludtke | 710/8 |
| 6,243,725 B1 | 6/2001 | Hempleman | |
| 6,263,503 B1 | 7/2001 | Margulis | |
| 6,289,165 B1 | 9/2001 | Abecassis | |
| 6,353,700 B1 * | 3/2002 | Zhou | 386/68 |
| 6,356,971 B1 | 3/2002 | Katz | |
| 6,359,661 B1 * | 3/2002 | Nickum | 348/734 |
| 6,393,430 B1 | 5/2002 | Van Ryzin | |
| 6,466,080 B2 | 10/2002 | Kawai | |
| 6,487,145 B1 | 11/2002 | Berhan | |
| 6,577,735 B1 | 6/2003 | Bharat | |
| 6,647,417 B1 | 11/2003 | Hunter et al. | |
| 6,657,116 B1 | 12/2003 | Gunnerson | |
| 6,741,617 B2 | 5/2004 | Rosengren | |
| 6,751,402 B1 * | 6/2004 | Elliott et al. | 386/83 |
| 6,816,175 B1 | 11/2004 | Hamp et al. | |
| 6,826,512 B2 * | 11/2004 | Dara-Abrams et al. | 702/183 |
| 6,839,769 B2 * | 1/2005 | Needham et al. | 709/243 |
| 6,901,603 B2 * | 5/2005 | Zeidler et al. | 725/39 |
| 6,931,593 B1 * | 8/2005 | Grooters | 715/717 |
| 6,938,101 B2 | 8/2005 | Hayes et al. | |
| 7,036,643 B2 | 5/2006 | Back | |
| 7,039,643 B2 | 5/2006 | Sena | |
| 7,231,175 B2 | 6/2007 | Ellis | |
| 7,260,461 B2 | 8/2007 | Rao et al. | |
| 2001/0026287 A1 | 10/2001 | Watanabe | |
| 2001/0039660 A1 | 11/2001 | Vasilevsky | |
| 2001/0042107 A1 | 11/2001 | Palm | |
| 2001/0051037 A1 * | 12/2001 | Safadi et al. | 386/83 |
| 2002/0010652 A1 | 1/2002 | Deguchi | |
| 2002/0043700 A1 * | 4/2002 | Sasaki et al. | |
| 2002/0046315 A1 | 4/2002 | Miller | |
| 2002/0059588 A1 * | 5/2002 | Huber et al. | 725/35 |
| 2002/0059642 A1 | 5/2002 | Russ et al. | |
| 2002/0069746 A1 | 6/2002 | Taira | |
| 2002/0070982 A1 | 6/2002 | Hill et al. | |
| 2002/0078293 A1 * | 6/2002 | Kou et al. | |
| 2002/0082901 A1 | 6/2002 | Dunning et al. | |
| 2002/0104091 A1 * | 8/2002 | Prabhu et al. | |
| 2002/0113824 A1 | 8/2002 | Myers, Jr. | |
| 2002/0166123 A1 | 11/2002 | Schrader | |
| 2002/0174444 A1 | 11/2002 | Gatto | |
| 2002/0180803 A1 | 12/2002 | Kaplan et al. | |
| 2002/0188735 A1 * | 12/2002 | Needham et al. | 709/229 |
| 2002/0194260 A1 | 12/2002 | Headley | |
| 2003/0035404 A1 | 2/2003 | Ozluturk | |
| 2003/0046437 A1 * | 3/2003 | Eytchison et al. | |
| 2003/0110272 A1 | 6/2003 | Du Castel | |
| 2003/0149988 A1 | 8/2003 | Ellis | |
| 2003/0214955 A1 | 11/2003 | Kim | |
| 2003/0220091 A1 | 11/2003 | Farrand | |
| 2004/0117831 A1 | 6/2004 | Ellis et al. | |
| 2004/0184763 A1 | 9/2004 | Difrancesco | |
| 2004/0255326 A1 | 12/2004 | Hicks, III et al. | |
| 2005/0028208 A1 | 2/2005 | Ellis | |
| 2005/0039208 A1 | 2/2005 | Veeck | |
| 2005/0227611 A1 | 10/2005 | Ellis | |
| 2006/0080707 A1 | 4/2006 | Laksono | |
| 2006/0259949 A1 | 11/2006 | Schaefer | |

OTHER PUBLICATIONS

Office Action (dated Aug. 9, 2007) for related U.S. Appl. No. 10/099,064, Daniel Putterman, filed Mar. 14, 2002.
U.S. Appl. No. 09/332,244, filed Jun. 11, 1999, Ellis.
U.S. Appl. No. 09/330,860, filed Jun. 11, 1999, Ellis.
U.S. Appl. No. 09/354,344, filed Jul. 16, 1999, Ellis.
Dimitrova, et al. "Personalizing Video Recorders Using Multimedia Processing and Integration." ACM 2001.
Haas et al., Proccedings of ICIP 2002 "Personalized News Through Content Augmentation and Profiling", Rochester, NY, Sep. 2002.
International Search Report of the International Searching Authority for related foreign application PCT/US2006/049398.

* cited by examiner

HOME MEDIA NETWORK

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

This invention relates generally to the field of network transaction services. More particularly, the invention relates to a method and apparatus for performing services on a home-based media network.

BACKGROUND

A typical household contains several home media devices. As used in this document, the term "home media device" encompasses electronics devices that are typically found in the home. Examples of home media devices may include such electronic devices as televisions, personal computers, video disc recorders (VDRs), digital video discs (DVDs), stereo equipment, and digital satellite services (DSS), etc.

However, a problem exists with home media devices such that each individual device is only capable of being used in one room of the home. For example, multiple televisions throughout a home typically cannot receive content from a DSS without supplying additional DSS set-top boxes for each television, or providing cable feeds to the additional televisions. Installing a set-top box at every television in the home is expensive. In addition, installing medium to high quality audio/video distribution is often expensive and time consuming. Therefore, what is desired is a method and apparatus for distributing electronic media from various home media devices throughout a home.

SUMMARY

According to one embodiment, a home media network is described. The home media network includes a first device configured to acquire and store digital media content, a transmission medium coupled to the first device and a second device coupled to the transmission medium. The second device is configured to determine that a first network user is requesting to access digital media content based upon a first remote identification (ID) corresponding to the first network user.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The displays presented herein are not inherently related to any particular computer or other systems. Various general-purpose systems may be used with programs in accordance with the teachings herein, or it may prove convenient to construct more specialized systems to perform the required methods. The required structure for a variety of these systems will be apparent from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, central processing units (CPUs), execution cores, etc.).

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Exemplary Network Architecture

Figure 1:
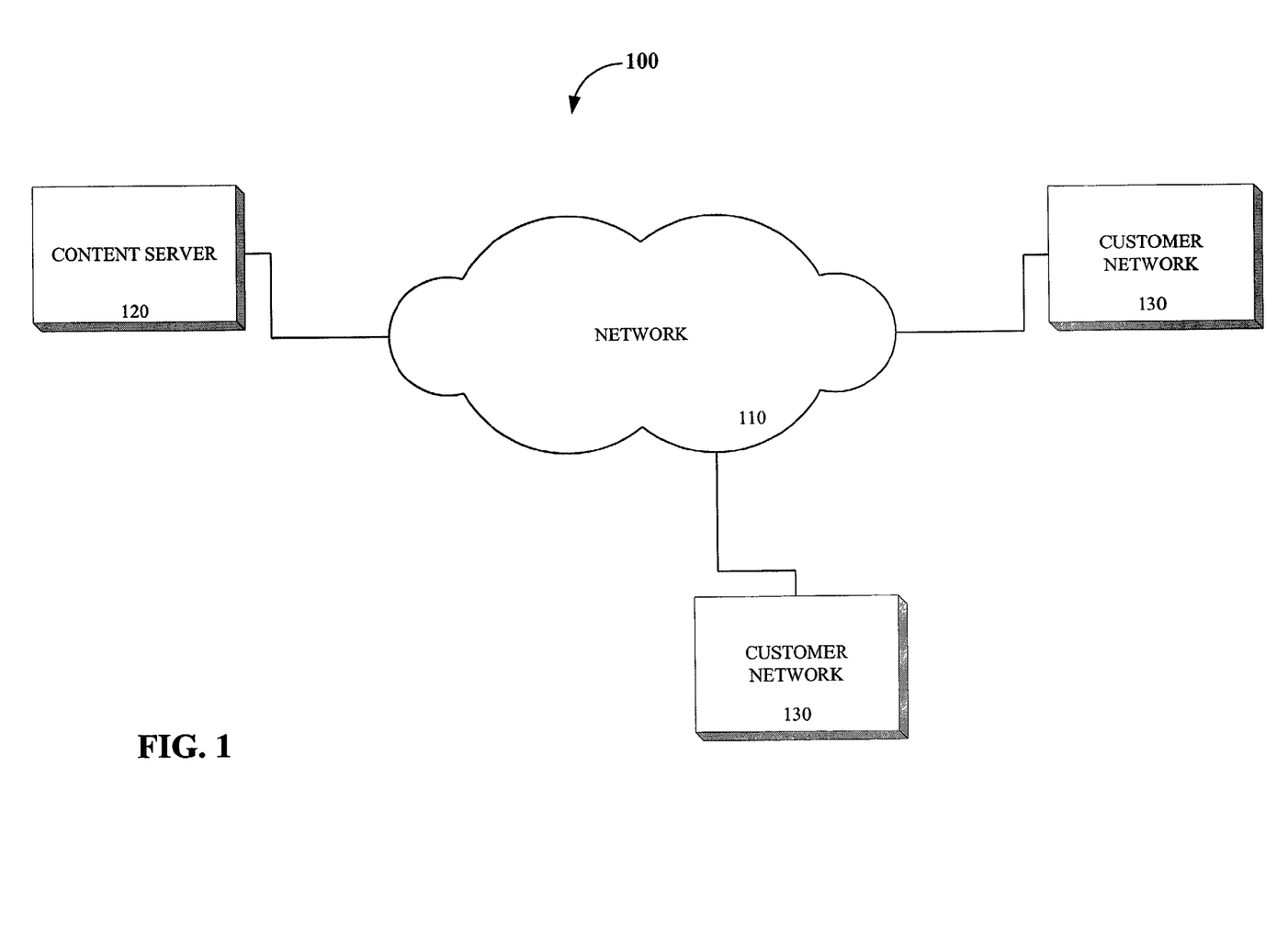
FIG. 1 illustrates one embodiment of exemplary network architecture.

FIG. 1 illustrates one embodiment of a system 100. System 100 includes network 110, a content server 120, and one or more customer networks 130. The teachings disclosed herein might be applied to various networks, data and document storage and archival facilities, or other types of client/server systems that have documents or other information available upon request.

According to one embodiment, server 120 is coupled to network 110 and is able to respond to requests from clients 130 via network 110. In one embodiment, the received requests are associated with the Internet (or World Wide Web (the WWW)). In such an embodiment, the servers act as inter-networked communications systems (e.g., WWW servers). That is, servers are directly coupled to a local area network (LAN) or wide area network (WAN) and "serve" data, such as images or other multi-media objects that they capture or create to the clients. Alternative communication channels such as wireless communication via satellite broadcast (not shown) are also contemplated within the scope of the present invention.

Content server 120 is accessible in order to provide digital content downloads to customer networks 130. In one embodiment, content server 120 is adaptable to transmit digital movies and digital music to customer networks 130 for on demand access. In another embodiment, customer networks 130 select from an authentication and payment mechanism that enables Pay-Per-View/Listen, Pay-Per-Download or content rental. In a further embodiment, content server 120 is adaptable to transmit news and informational videos (e.g., news, sports or other footage) to customer networks 130. In a further embodiment, content server 120 may be configured to manage the distribution of user created content between multiple customer networks 130. In yet another embodiment, server 120 is adaptable to transmit software upgrades to customer networks 130.

According to one embodiment, server 120 may include a database for storing various types of data. The database may include, for example, specific client data (e.g., client account information and client preferences) and/or more general data. The database on server 120 in one embodiment runs an instance of a Relational Database Management System (RDBMS), such as Microsoft™ SQL-Server, Oracle™ or the like.

Customer networks 130 may interact with and receive feedback from server 120, and each other, using various different communication devices and/or protocols. According to one embodiment, a network 130 connects to content server 120 and other networks 130 via client software. The client software may include a browser application such as Netscape Navigator™ or Microsoft Internet Explorer™ on which the client communicates to the server and/or a data center via the Hypertext Transfer Protocol (hereinafter "HTTP").

Exemplary Home Network Architecture

Figure 2:
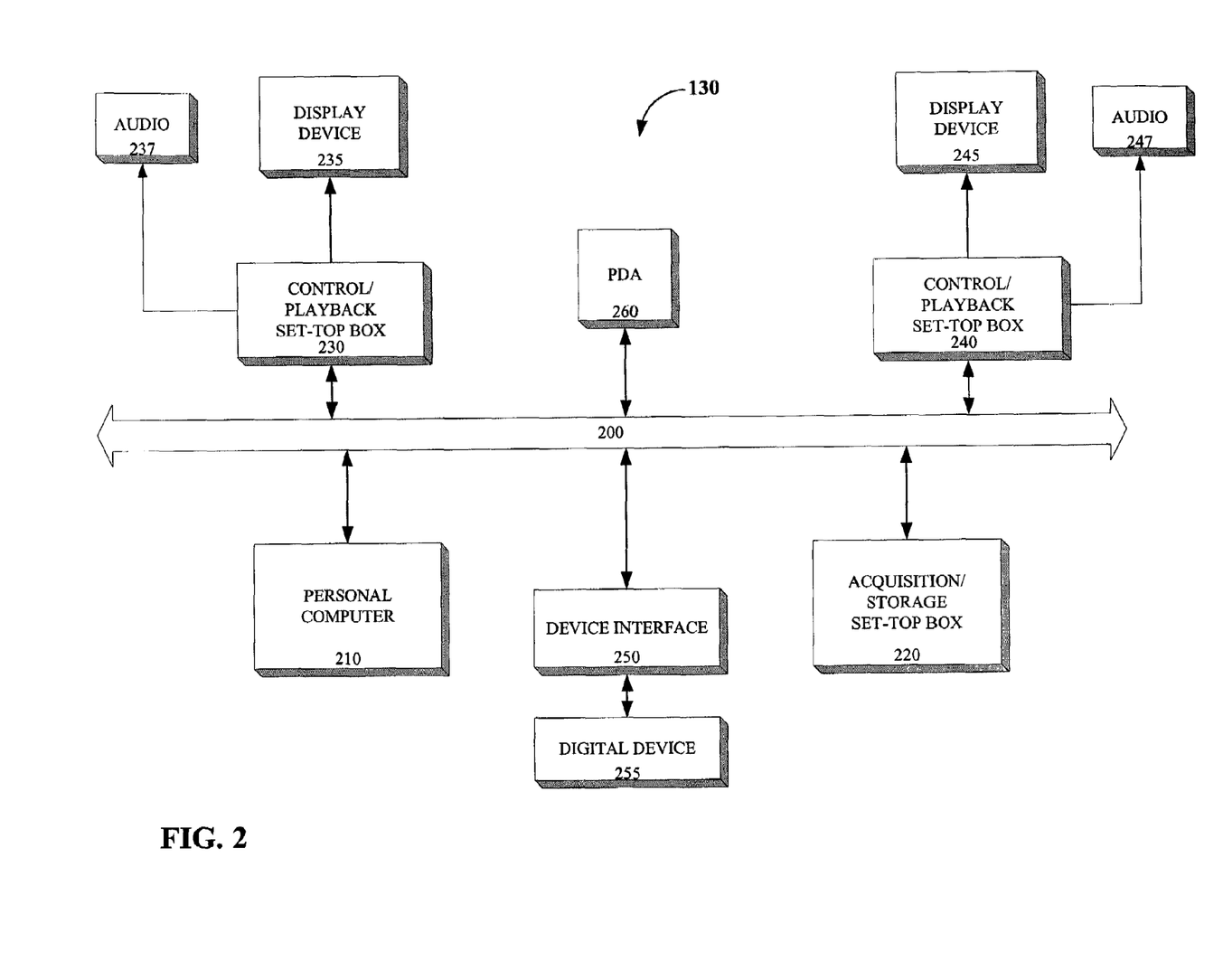
FIG. 2 illustrates one embodiment of home network architecture.

FIG. 2 illustrates one embodiment of customer network 130. According to one embodiment, customer network 130 comprises a home network. The home network includes a personal computer (PC) 210, an acquisition/storage set-top box 220, control/-playback set-top boxes 230 and 240, a device interface 250 and a personal digital assistant (PDA) 260 all coupled via a data transmission medium 200. Further, display devices 235 and 245 are coupled to set-top boxes 230 and 240, respectively. In addition, audio devices 237 and 247 are coupled to set-top boxes 230 and 240, respectively. In one embodiment, display devices 235 and 245 are televisions and the audio devices are AM/FM stereos. However, one of ordinary skill in the art will appreciate that the display devices (e.g., LCD) and audio devices (e.g., speakers) may be implemented using other types of devices.

According to one embodiment, digital data content objects are transmitted from one device within the home network to the other devices via transmission medium 200. The objects may be, for example, data files, executables, or other digital objects. In one embodiment, transmission medium 200 is an internal network connection. In a further embodiment, transmission medium 200 may be connected to network 110 via one or more routers (not shown) and switches (not shown). Accordingly, data content may be transmitted from a device in the home network to content server 120 and one or more other customer networks 130 via network 110.

In one embodiment, PC 210 interacts with and receives feedback from set-top box 220. PC 210 connects to set-top box 120 via client software. As described above, the client software may include a browser such as Netscape Navigator™ or Microsoft Internet Explorer™ on which PC 210 communicates to the servers via HTTP. In a further embodiment, included within the scope of the invention, PC 210 may communicate with set-top box 220 via cellular telephones and other wireless devices and appliances (e.g., in which the necessary transaction software is electronic in a microchip), and/or touch-tone telephones.

As described above, PC 210 is adaptable to access the contents of set-top box 220. In addition, PDA 260 may also be used to access set-top box 220. For example, PC 210 (or PDA 260) may retrieve a music file from set-top box 220 for audio playback at PC 210. Similarly, PC 210 and PDA 260 may retrieve an image file from set-top box 220 for display. In a further embodiment, PC 210 may transmit files to set-top box 220 for storage and playback at home media devices coupled to set-top box 220.

Moreover, PC 210 and PDA 260 may be used to organize digital content stored at set-top box 220. For example, a user at PC 210 may access a user play list stored in set-top box 220. Upon accessing the play list, the user may add, delete or reorganize the music files stored within set-top box 220. In a further embodiment, the user can control the playing of music files within set-top box 220. In such an embodiment, set-top box 220 may be playing audio files from a particular music play list in a predetermined order. As the music files are played, set-top box 220 is adaptable to transmit the music to PC 210, set-top boxes 230 and 240 and/or PDA 260. The user at PC 210 may not wish to hear the next song in the play list, and therefore, may stop the playing audio of the current file being played and select another file in the play list for playback.

Set-top box 220 is implemented to acquire, and store digital content. In addition set-top box 220 is adaptable to organize and manage the content once the content has been acquired. According to one embodiment, set-top box 220 acquires content from content server 120 (or other servers) via network 110. In a further embodiment, set-top box 220 receives commands from peer devices (e.g., PC 210, set-top boxes 230 and 240, PDA 260, etc.) to access the content stored at set-top box 220. In such an embodiment, the content stored at set-top box 220 may be played back at various peer devices throughout a user's home upon user demand. For example, stored video, music and/or image data may be presented to one or more users at display devices 235 and 245, audio devices 237 and 247 and PDA 260. In addition, as described above, set-top box 220 may receive commands from PC 210 to access music files and play lists stored at set-top box 220.

According to one embodiment, set-top box 220 may distribute content received from media devices throughout the user's home. In a further embodiment, the content may be accessed from any display device or stereo system within the home. According to yet a further embodiment, set-top box 220 serves multiple users in the home. In such an embodiment, set-top box 220 may simultaneously perform different sessions for each user with no overlap or interference. The multi-session, multi-user applications of set-top box 220 will be described below in further detail.

Set-top boxes 230 and 240 perform control and playback functions similar to PC 210 and PDA 260. In particular, set-top boxes 230 and 240 are used to control the retrieval of data from set-top box 220 via transmission medium 200 in order to play the media data. Data received at set-top box 230 or 240 is transmitted to its respective display device (or audio device) for presentation of the content to the user. In one embodiment, set-top boxes 230 and 240 are remotely located from set-top box 220. However, in other embodiments, set-top box 230 and/or 240 may be incorporated into set-top box 220 or located adjacent to set-top box 220. In such embodiments, set-top boxes 230 and 240 (or associated device logic) are coupled to the respective display devices via an analog network and to audio devices 237 and 247 via radio frequency.

Device interface 250 interfaces, under the control of set-top box 220, one or more digital devices 255 to transmission medium 200 in order to transmit digital media data to set-top boxes 230 and 240, and/or audio devices 237 and 247. According to one embodiment, device interface 250 includes a decoder (e.g., a Motion Picture Expert Group (MPEG) decoder) in order to decode the digital data received from a digital device for transmission via transmission medium 200. In a further embodiment, device interface 250 is adaptable to translate infrared remote signal commands to commands that are recognized by a digital device 255. As a result a user operating a set-top box 230 or 240 may remotely control the operation of a digital device 255. According to one embodiment, digital device 255 is a digital video disk (DVD). However, in other embodiments, digital device 255 may be implemented using other digital devices (e.g., compact disc or digital cable set-top box).

In yet another embodiment, set-top box 220 may acquire digital content from a digital device 255 via device interface 250. For example, set-top box 220 may extract and save music files from a compact disc (CD) being played by a CD player coupled to set-top box 220. In a further embodiment, upon extracting each music file, set-top box 220 transmits the identification information for each song to content server 120 for automatic information lookup. Content server 120 searches a database for the corresponding information.

Subsequently, content server 120 transmits identification information that is stored as a component of each song file. The identification information may include, for example, a music artist's name, CD title and the title for each song on the CD. According to another embodiment, set-top box 220 may store digital images from a digital camera coupled to set-top box 220. In such an embodiment, a user accessing a display device may organize the stored image data into a photo album.

According to a further embodiment, each device in the home network includes a discovery mechanism. The discovery mechanism enables each of the devices on the home network, and between multiple home networks, to identify the other devices and determine the capabilities of such devices without a management network (e.g., no requirement for server names and IP addresses be known). For example, set-top box 220 may identify personal computer 210 using the discovery mechanism.

According to one embodiment, devices attached to the home network announce their presence via a User Datagram Protocol (UDP) Multicast packet when they are powered up. All other devices previously coupled to the network receives this packet and recognizes that the device is on the network and is capable of continuing communication. Similarly, any device coupled to the home network is able to transmit a discovery request packet. All other devices on the network that wish to be found will respond to the discovery request packet.

Exemplary Architectures of Peer Devices

Figure 4:
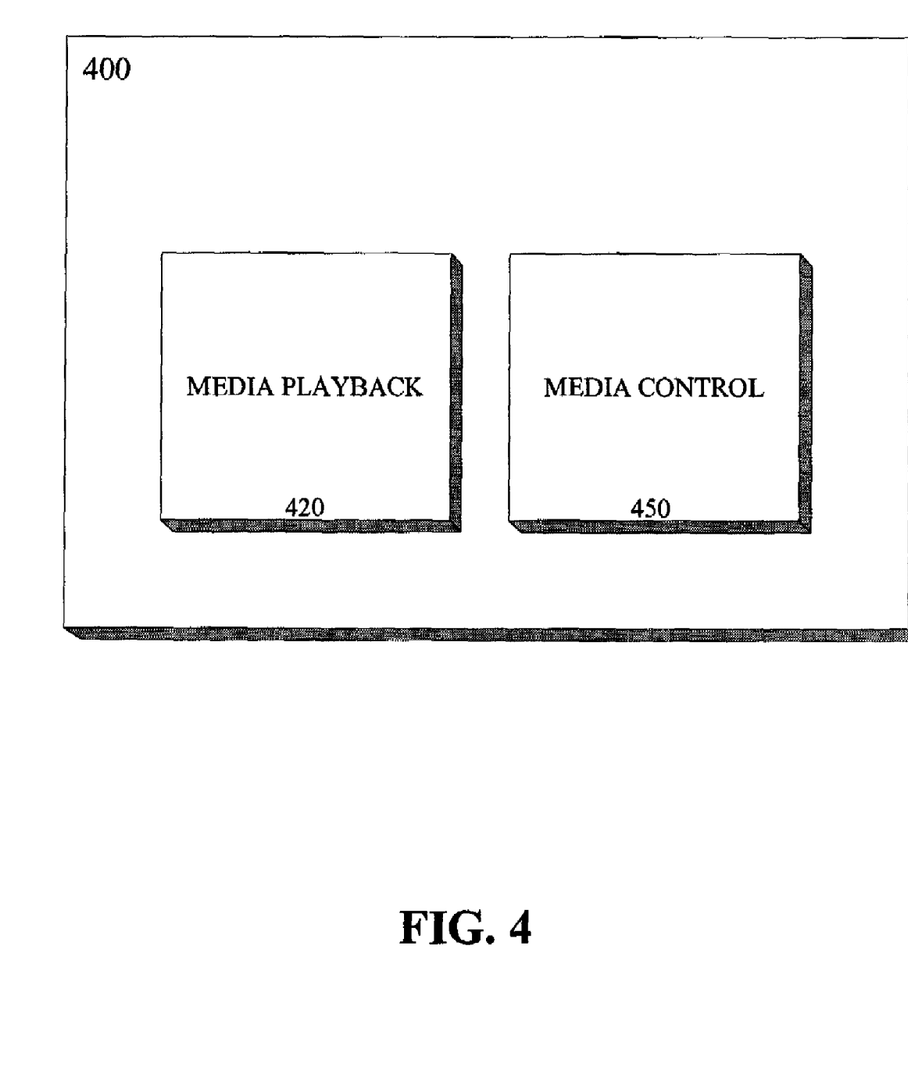
FIG. 4 is a block diagram of one embodiment of a control/playback set-top box.
Figure 5:
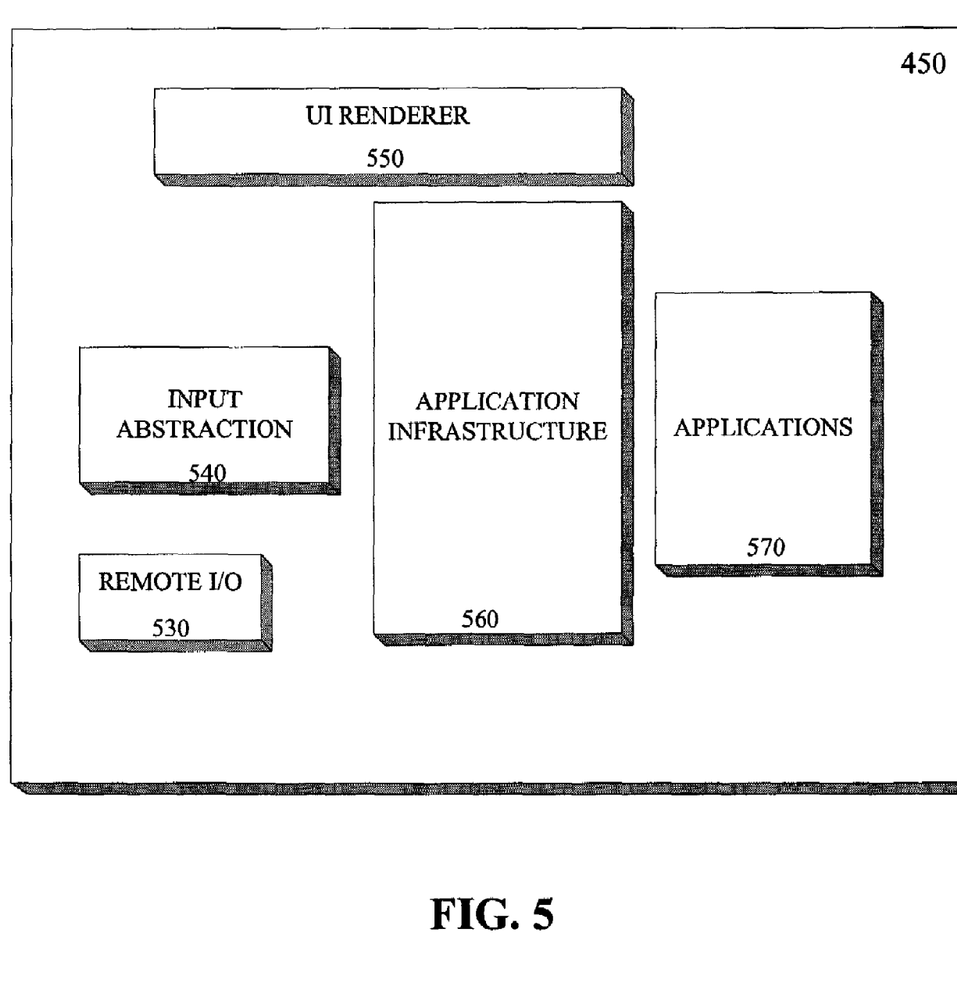
FIG. 5 is a block diagram of one embodiment of a media control module.

FIG. 4 is a block diagram of one embodiment of a control/playback device 400. A control/playback device may comprise PC 210, set-top boxes 230 and 240, and PDA 260. In one embodiment, device 400 includes a media playback module 420 and a media control module 450. Media control module 450 controls the playback of media content at a particular device 400 (not necessarily itself). FIG. 5 is a block diagram of one embodiment of a control module 450. Control module 450 includes remote control input/output (I/O) 530, input abstraction 540, user interface (UI) renderer 550, application infrastructure 560 and applications 570.

Remote I/O 530 receives data input from a remote control. According to one embodiment, each user of the home network uses a different remote control device wherein each device has a unique identification (remote ID). Upon the remote ID being received by remote control I/O 530, the client device determines which user of the home network is making the request. The user information is subsequently transmitted to set-top box 220. Set-top box 220 analyzes the user information in determining whether the particular user has access to the particular media data that has been requested.

One application of remote IDs is an example where a user at a set-top box attempts to access the personal media files of another user. After remote control I/O 530 has determined the user requesting access and the user identity is transmitted to set-top box 220, set-top box 220 determines that the user requesting access is not the owner of the media files being requested. At this point set-top box 220 may grant access depending upon the owner user's access configuration. In another embodiment, parental controls may be implemented so that minor users may not access explicit content, whether the content be audio or video media. For example, after the client device has identified the user, set-top box 220 may determine that the user is a minor and prevent the video or music file from being delivered to the client device.

Input abstraction 540 provides an interface to an application 570 and a media player at media playback module 420 in order to interpret user actions via remote control, keyboard or any other type of input device. UI renderer 550 renders the client device user interface on to a display device. Application infrastructure 560 interfaces control module 450 with the operating system running on the device 400. Applications 570 comprise the media applications that operate on the client device. For example, applications 495 may include an application that enables a client device user to view a photograph album.

Figure 6:
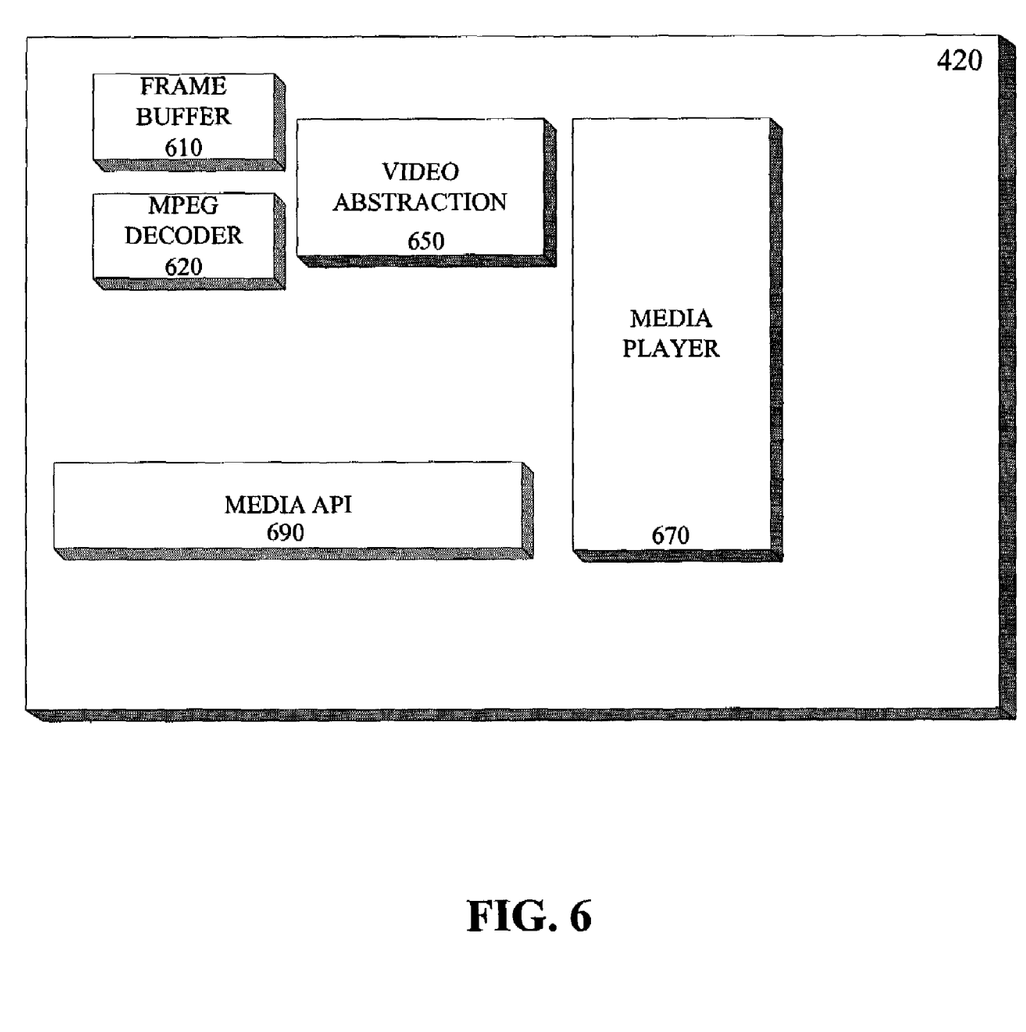
FIG. 6 is a block diagram of one embodiment of a media playback module.

Referring back to FIG. 4, playback module 420 controls the interface between the device 400 and connected display and/or audio devices. FIG. 6 is a block diagram of one embodiment of a media playback module 420. Media playback module 420 includes a frame buffer 610, a MPEG decoder 620, a video abstraction 650, a media player 670 and a media access API 690

Frame buffer 610 is an area of memory that is used to hold a frame of data. According to one embodiment, frame buffer 610 is used for display device display and is the size of the maximum image area on the display device 235 and 245 screen. Frame buffer 610 holds a bitmapped image while it is being "painted" on a display device. MPEG decoder 620 decompresses MPEG data into viewable form that may be displayed at a display device.

Video abstraction 650 provides hardware support for decode and video display to be transparent. Media player 670 is used to execute audio, video and animation files received from set-top box 220. Media API 690 enables a control/playback set-top box 230 to communicate with other peer devices (e.g., the storage/management component of storage/acquisition set-top box 220). In particular, media API 690 is the mechanism by which other components can connect to playback module 420 and control it.

Figure 7:
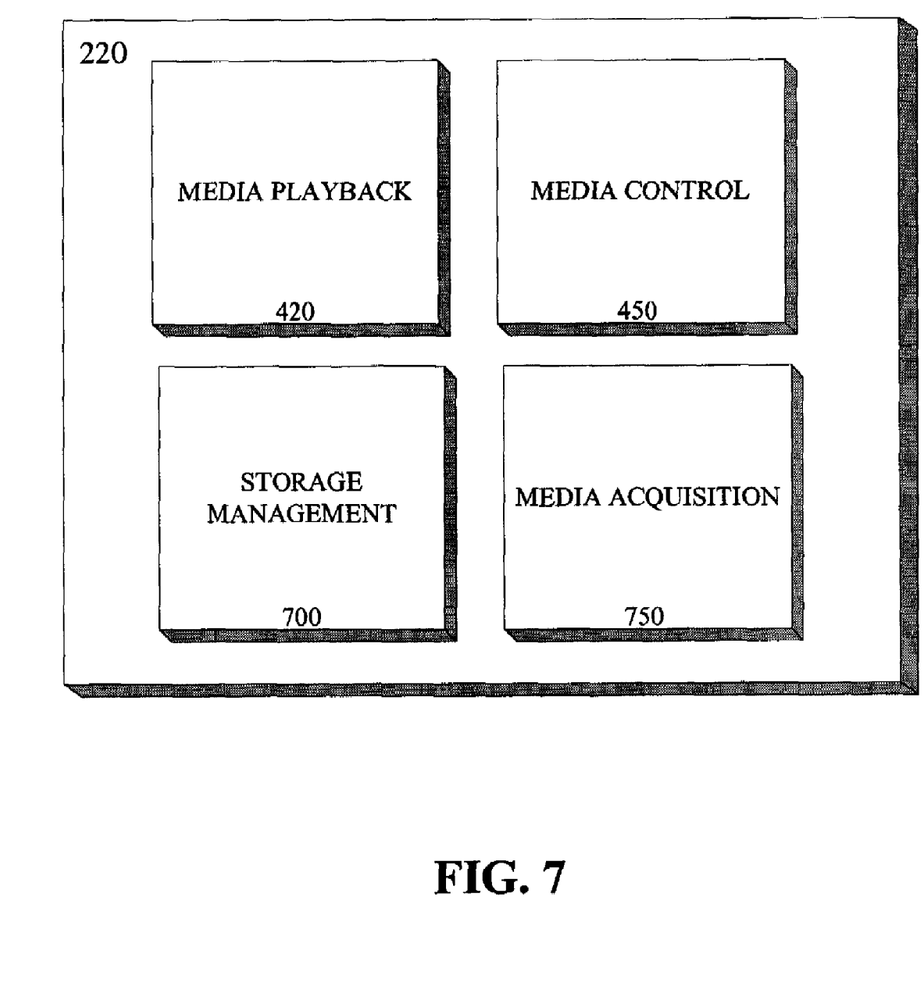
FIG. 7 is a block diagram of one embodiment of an acquisition/storage set-top box.

FIG. 7 is a block diagram of one embodiment of set-top box 220. Set-top box 220 also includes a media playback module 420 and a media control module 450. Media playback module 420 and a media control module 450 include the same components as described above. In embodiments where set-top box 220 includes media playback module 420 and a media control module, the display and audio devices may be coupled directly to set-top box 220 or via various analog connections. However, one of ordinary skill in the art will appreciate that set-top box 220 may be implemented without media playback module 420 and media control module 450.

In addition, set-top box 220 includes a storage management module 700 and a media acquisition module 750. Storage management module 700 stores and manages media as well as enforcing business rules associated with the media objects. For example, storage management module 700 is responsible for cataloging incoming media objects into a catalog that is specific by media type in order to create a particular media experience. By authenticating the devices 400 that connect to storage management module 700, storage management module 700 can ensure that both sensitive materials are protected and copyright and usage rules dictated by the media creator or distributor are ensured. Further, storage management module 700 is also responsible for ensuring any transactions that are to be performed on use are performed before use.

Figure 8:
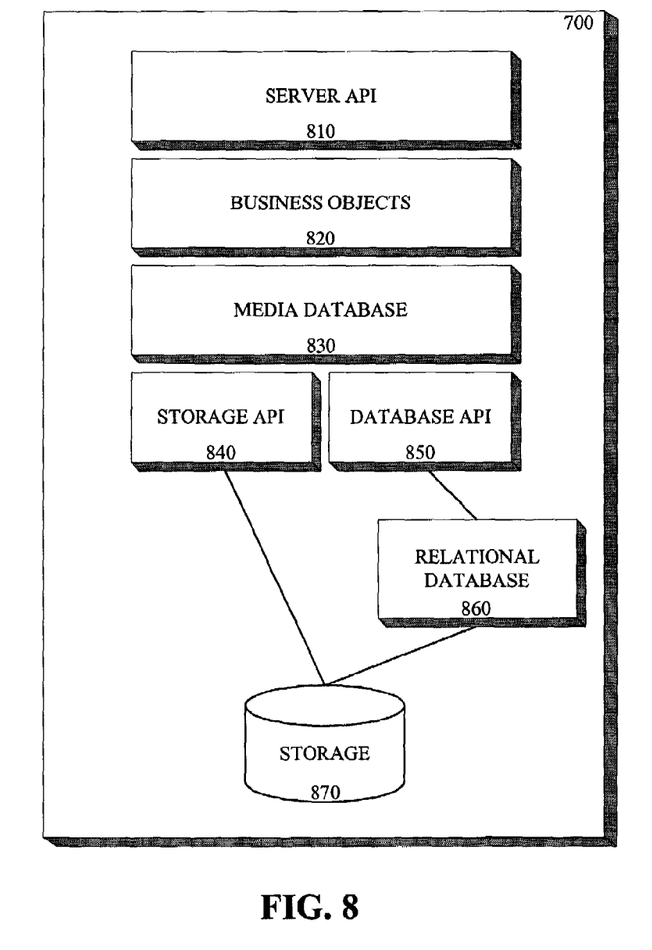
FIG. 8 is a block diagram of one embodiment of a storage management module.

FIG. 8 is a block diagram of one embodiment of storage management module 700. Storage management module 700 includes a server application program interface (API) 810, business objects 820, media database 830, storage API 840, database API 850, relational database 860 and storage 870. Server API 810 allows other network entities (e.g., business objects 620) to find and communicate with storage management module 700. Business objects 820 abstract data and provide logic about enforcing business rules, digital rights management, etc. Media database 830 is a collection of media objects organized in such a way that set-top box 220 can quickly select a desired object.

Storage API 840 is a control program that interfaces with storage 870 and abstracts the storage location. Database API 850 is a control program such as a database management system that interfaces with relational database 860. According to one embodiment, database API 850 is a collection of programs that enables the entering, organization, and selection of data in relational database 860. Relational database 860 provides relationships between media files that are created by comparing data. Storage 870 provides for the storage of media data.

Figure 9:
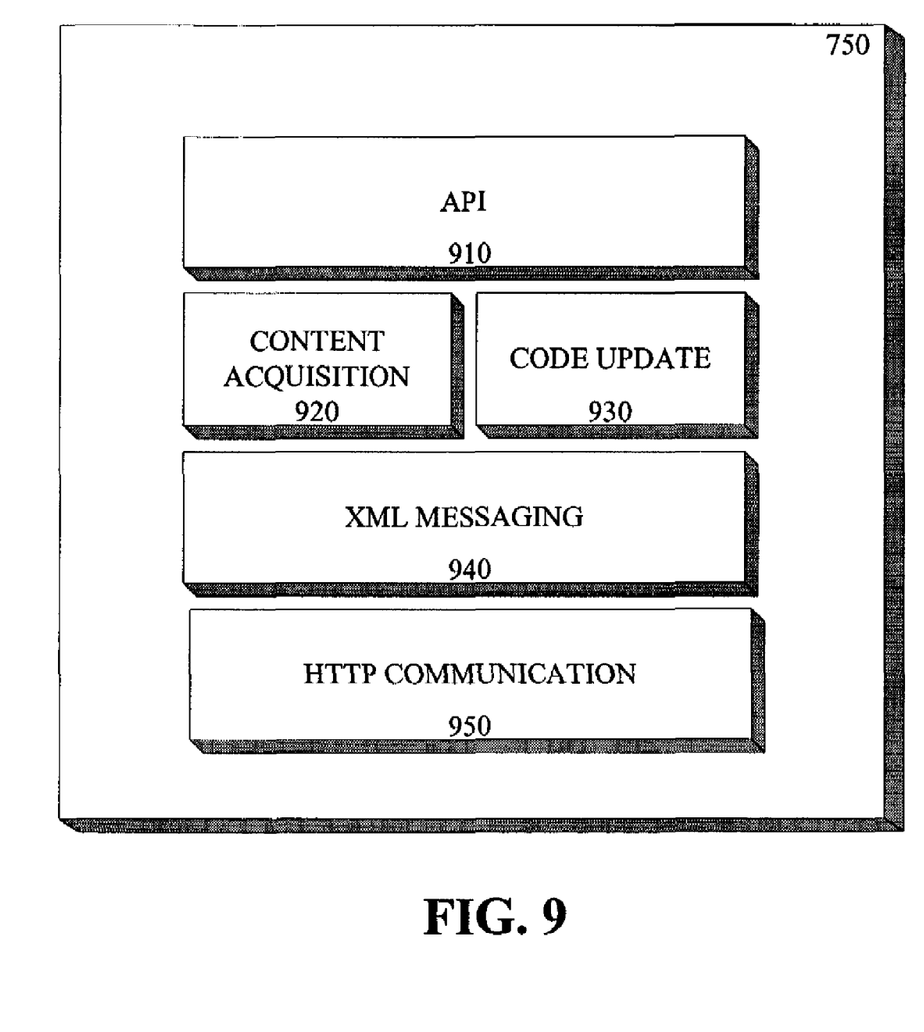
FIG. 9 is a block diagram of one embodiment of a media acquisition module.

Referring back to FIG. 7, media acquisition module 750 acquires media content from data sources (e.g., content server 120) on network 110. FIG. 9 is a block diagram of one embodiment of media acquisition module 750. Media acquisition module 750 includes API 910, content acquisition 920, code update 930, extensible markup language (XML) messaging 940 and HTTP communication 950. API 910 interfaces set-top box 220 with a client device such as set-top boxes 230 and 240.

Content acquisition 920 makes media storage management module 700 aware of new media available at content server 120. Content acquisition 920 is configured to retrieve media content from content providers such as content server 120 through the Internet. In particular, content acquisition 920 connects to the providers and retrieves content that the users have either requested or that matches the profile that they system has been built for the users.

Code update 730 enables components within the home network to retrieve updated software from content server 120. XML messaging 740 transmits and receives messages to/from other components within the home network. According to one embodiment, messages are encoded in XML to enable handling in a platform independent manner. HTTP communication 750 embeds the XML messages into a HTTP format to enable the messages to be transparently transmitted through proxy servers and firewalls connected to network 110.

System Operation

Figure 10:
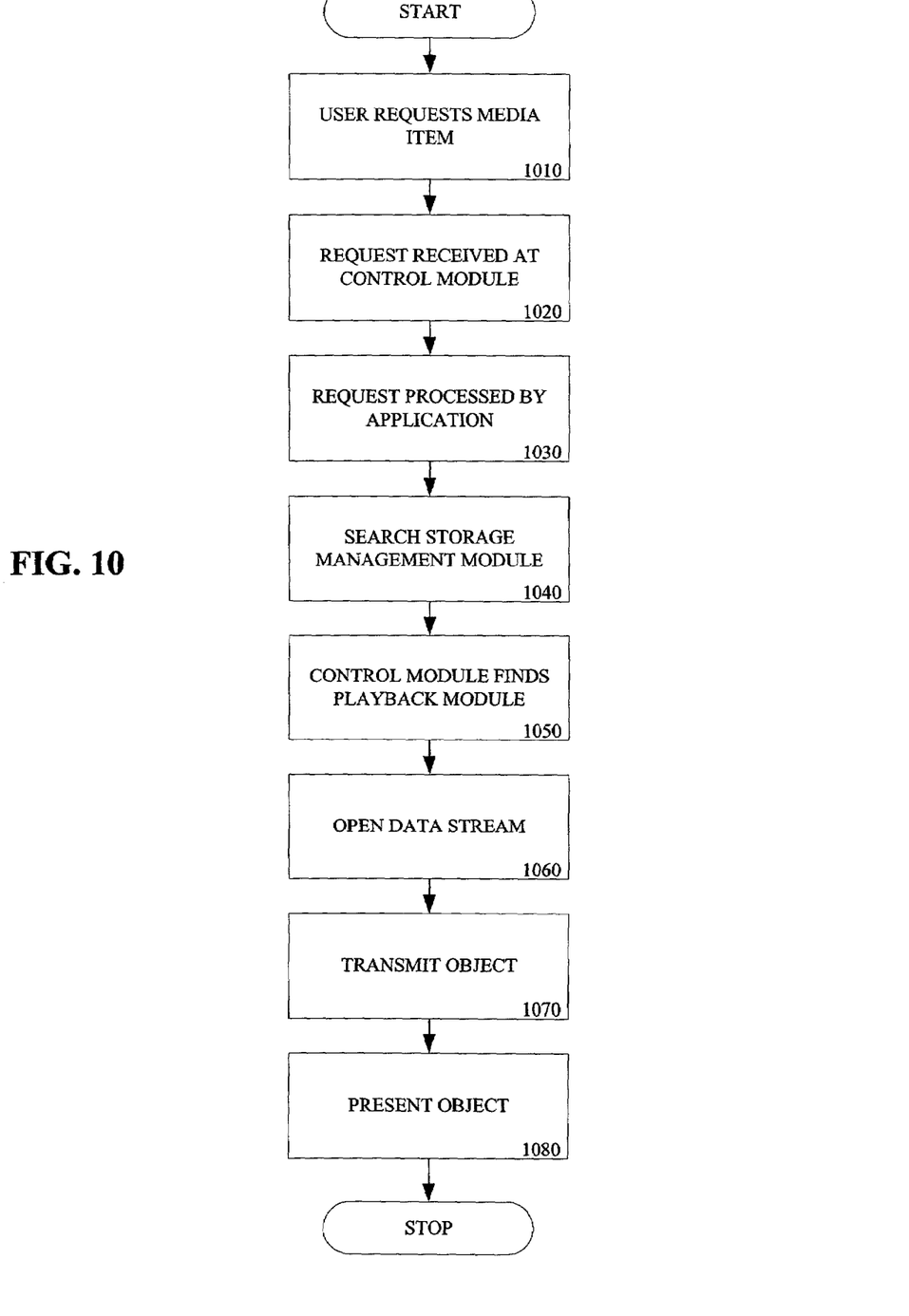
FIG. 10 is a flow diagram for one embodiment of playing a media object within a home network.

Although the present event system will be discussed with reference to various illustrated examples, these examples should not be read to limit the broader spirit and scope of the present invention. FIG. 10 is a flow diagram for one embodiment of the operation of playing a media object within the home network. At processing block 1010, a user accessing a device 400 (e.g., PC 210, set-top box 230, etc.), or set-top box 220 in applications where set-top box 220 includes control and playback functionality, requests to access to a media object while viewing a display device or listening to an audio device. As described above, the user access is implemented via a personal remote control.

At processing block 1020, the request is received at remote control I/O 640 within the control module 450 of the device 400. Remote control I/O 530 extracts the remote ID from the request. Subsequently, the device 400 determines the user that is making the request. According to one embodiment, the client device determines the requesting user by accessing an index table. The index table associates each remote ID to a user.

At processing block 1030, the request is processed by application infrastructure 560. According to one embodiment, application infrastructure 560 determines whether the user making the request is authorized to receive the media object. If the requesting user is authorized, media control module 450 finds storage management module 700 and searches for the media object at process block 1040. After the media object is found, control module 450 finds media playback module 420 and gives playback module 420 the storage information for the media object, process block 1050. At process block 1060, playback module 420 opens a data stream with storage management module 700. At process block 1070, the media object is transmitted to playback module 420. At processing block 1080, playback module 420 presents the media object to the user via a display device or audio device.

Figure 11:
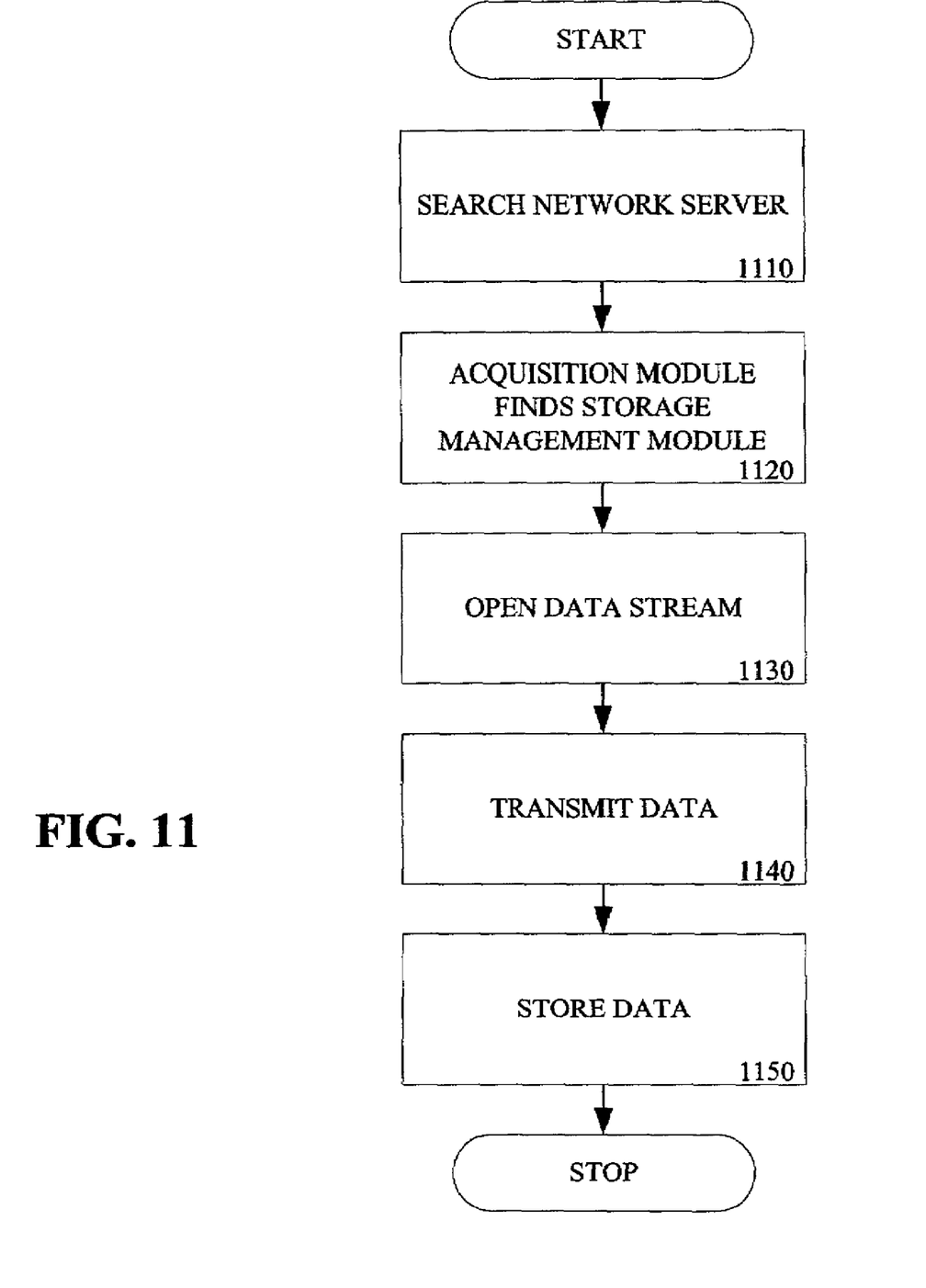
FIG. 11 is a flow diagram for one embodiment of acquiring a media object at a home network.

FIG. 11 is a flow diagram for one embodiment of acquiring a media object at a home network. At process block 1110, content acquisition 920 within media acquisition module 750 initiates a search of a server (e.g., content server 120) on network 110 in order to find one or more desired media objects using XML messaging 940 and HTTP communication 950. In one embodiment, the search is initiated directly by a user via media control module 450. Alternatively, content acquisition 920 is configured to periodically search servers on network 110 based upon a user profile.

Once the media objects are found, media acquisition module 750 finds storage management module 700 at process block 1120. At process block 1130, a data stream is opened between the server and storage management module 700. At process block 1140, the media object is transmitted to storage management module 700. At processing block 1150, the data is stored at storage management module 700.

Exemplary Computer Architecture

Figure 3:
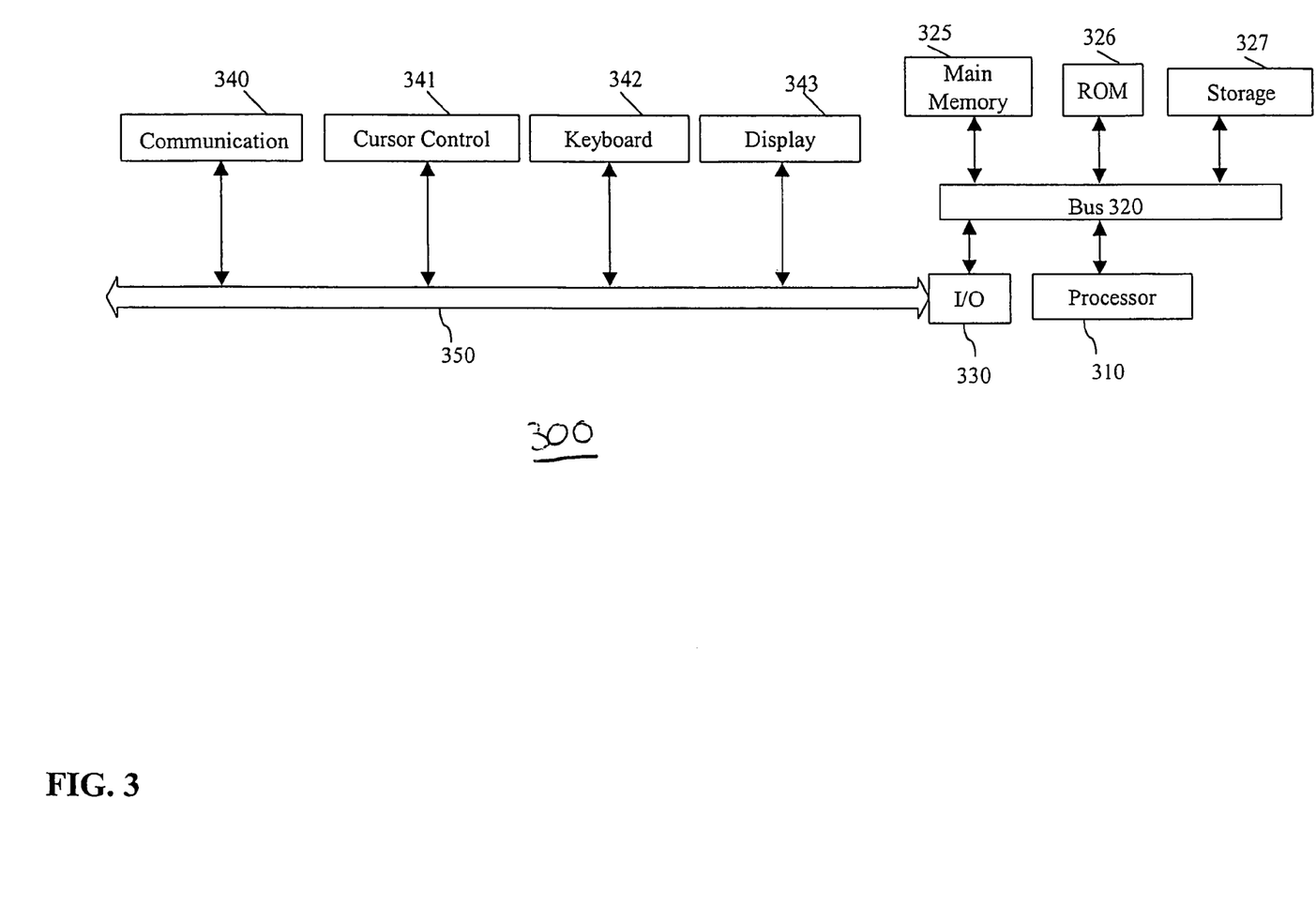
FIG. 3 is a block diagram of one embodiment of exemplary computer architecture.

Having described an exemplary network architecture that employs various elements of the present invention, a computer system 300 representing exemplary PC 210 and/or set-top boxes 220, 230 and 240 in which elements of the present invention may be implemented will now be described with reference to FIG. 3.

One embodiment of computer system 300 includes a system bus 320 for communicating information, and a processor 310 coupled to bus 320 for processing information. Computer system 300 further comprises a random access memory (RAM) or other dynamic storage device 325 (referred to herein as main memory), coupled to bus 320 for storing information and instructions to be executed by processor 310. Main memory 325 also may be used for storing temporary variables or other intermediate information during execution of instructions by processor 310. Computer system 300 also may include a read only memory (ROM) and/or other static storage device 326 coupled to bus 320 for storing static information and instructions used by processor 310.

A data storage device 327 such as a magnetic disk or optical disc and its corresponding drive may also be coupled to computer system 300 for storing information and instructions. Computer system 300 can also be coupled to a second I/O bus 350 via an I/O interface 330. A plurality of I/O devices may be coupled to I/O bus 350, including a display device 343, an input device (e.g., an alphanumeric input device 342 and/or a cursor control device 341). The communication device 340 is for accessing other computers (servers or clients) via network 110 and/or transmission medium 200. The communication device 340 may comprise a modem, a network interface card, or other well-known interface device, such as those used for coupling to Ethernet, token ring, or other types of networks.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A home media system comprising:
   network;
   coupled to said network, a plurality of media devices comprising a plurality of different types of media objects comprising media, said plurality of media devices comprising a video device comprising video objects, an audio device comprising audio objects, and an image device comprising image objects;
   acquisition storage set-top box, coupled to said network, configured for:
      acquiring a plurality of different types of media objects comprising video, audio, and image objects from the plurality of media devices;
      storing the plurality of different types of media objects; and
      organizing the plurality of different types of media objects based on the type of media object; and
   control/playback set-top box, coupled to said network, configured for:
      accessing, across said network, at least one media object from said acquisition storage set-top box;
      running at least one of a plurality of media applications that provide functionality, through a user interface, to play media, said plurality of media applications comprising a video application for playing video media, an audio application for playing audio media, and a photo application for viewing image media;
      receiving a first request for a first media object;
      retrieving, across said network, said first media object from said acquisition storage set-top box;
      running a first media application for playing first media in said first media object;
      receiving a second request for a second media object;
      retrieving, across said network, said second media object from said acquisition storage set-top box; and
      running a second media application for playing second media in said second media object, wherein said first and second media applications are run simultaneously and said first and second media are played simultaneously; and
   plurality of client devices, coupled to said control/playback set-top box, the plurality of client devices comprising a display client device for displaying said user interface for said media application and for displaying video or image media and an audio client device for presenting audio media.

2. The home media system as set forth in claim 1, wherein said acquisition storage set-top box is further configured for acquiring a plurality of different types of media objects comprising video, audio, and image objects from a content server that is external to said network.

3. The home media system as set forth in claim 1, wherein said control/playback set-top box comprises a personal computer system.

4. The home media system as set forth in claim 1, wherein said playback module of said control/playback set-top box comprises a frame buffer.

5. The home media system as set forth in claim 1, further comprising a personal digital assistant ("PDA") for receiving user input to control said control/playback set-top box.

6. The home media system as set forth in claim 1, further comprising:
   digital device for accessing digital data stored on a digital medium; and
   device interface, coupled to said digital device, for decoding said digital data and for transmitting said digital data on said network.

7. The home media system as set forth in claim 1, wherein said audio client device is configured to only play audio media and not being configured to display video or image media.

8. The home media system as set forth in claim 7, wherein said audio client device comprises a stereo system.

9. The home media system of claim 1, wherein:
said video device comprises a video disc recorder or a digital video disc player;
said audio device comprises a compact disc player; or
said image device comprises a digital camera.

10. The home media system of claim 1, wherein said control/playback set-top box is further configured for receiving, from a remote control, a user request for a particular media object and for extracting a unique identification of the remote control from the user request, said unique identification being used to restrict access to the particular media object.

11. The home media system of claim 1, wherein:
said first media object comprises a video object and said first media application comprises a video application; and
said second media object comprises an audio object and said second media application comprises an audio application.

* * * * *